(12) United States Patent
Hong

(10) Patent No.: US 6,270,158 B1
(45) Date of Patent: Aug. 7, 2001

(54) LUMBAR SUPPORT LOCKING APPARATUS FOR A CAR SEAT

(76) Inventor: Jung-myung Hong, 1501-202 Seongjeo Village, 2115 Deahwa-dong, Ilsan-gu, Koyang-shi (KR), 411-410

( * ) Notice: Subject to any disclaimer, the term of this patent is extended or adjusted under 35 U.S.C. 154(b) by 0 days.

(21) Appl. No.: 09/553,987

(22) Filed: Apr. 20, 2000

(51) Int. Cl.⁷ .................................. B60N 2/44; A47C 7/46
(52) U.S. Cl. ....................................... 297/284.4; 297/284.7
(58) Field of Search ............................. 297/284.4, 284.7, 297/284.1

(56) References Cited

U.S. PATENT DOCUMENTS

| | | | |
|---|---|---|---|
| 5,518,294 | * | 5/1996 | Ligon, Sr. et al. ................. 297/284.4 |
| 5,769,491 | * | 6/1998 | Schwarzbich ....................... 297/284.4 |
| 6,036,265 | * | 3/2000 | Cosentino ....................... 297/284.1 X |

* cited by examiner

*Primary Examiner*—Peter R. Brown
(74) *Attorney, Agent, or Firm*—Madson & Metcalf

(57) ABSTRACT

A lumbar support employing a supporting member having a plurality of elastic support wings interposed between upper and lower car seat frames wherein the plurality of support wings are folded at both side end parts. A support plate having a center portion which is curved and protrudes substantially outward from the center and includes locking grooves formed at both upper and lower ends. Preferably, a support height control member is operably disposed at one side of the support plate for controlling the height of the protruded center portion of the support plate. A lumbar support locking apparatus is also provided which includes members for fixing the respective upper and lower locking grooves of the support plate in relative engagement with the locking grooves of the locking member. The lumbar support locking apparatus also includes a pair of front fixing pieces formed on opposing sides which are adapted to be inserted into engagement with the seat frames. A rear fixing piece is formed between each one of the pair of front fixing pieces by folding downward. In addition, a connecting plate is folded inward at a predetermined angle in the center portion of the locking apparatus and has a connecting groove formed at a lower part thereof, wherein the lumbar support may be fixed to the car seat without any additional brackets, and the front and rear fixing pieces fixedly engage the lumbar support in the seat frames more firmly, thereby preventing deviation of the lumbar support from the seat frames.

1 Claim, 3 Drawing Sheets

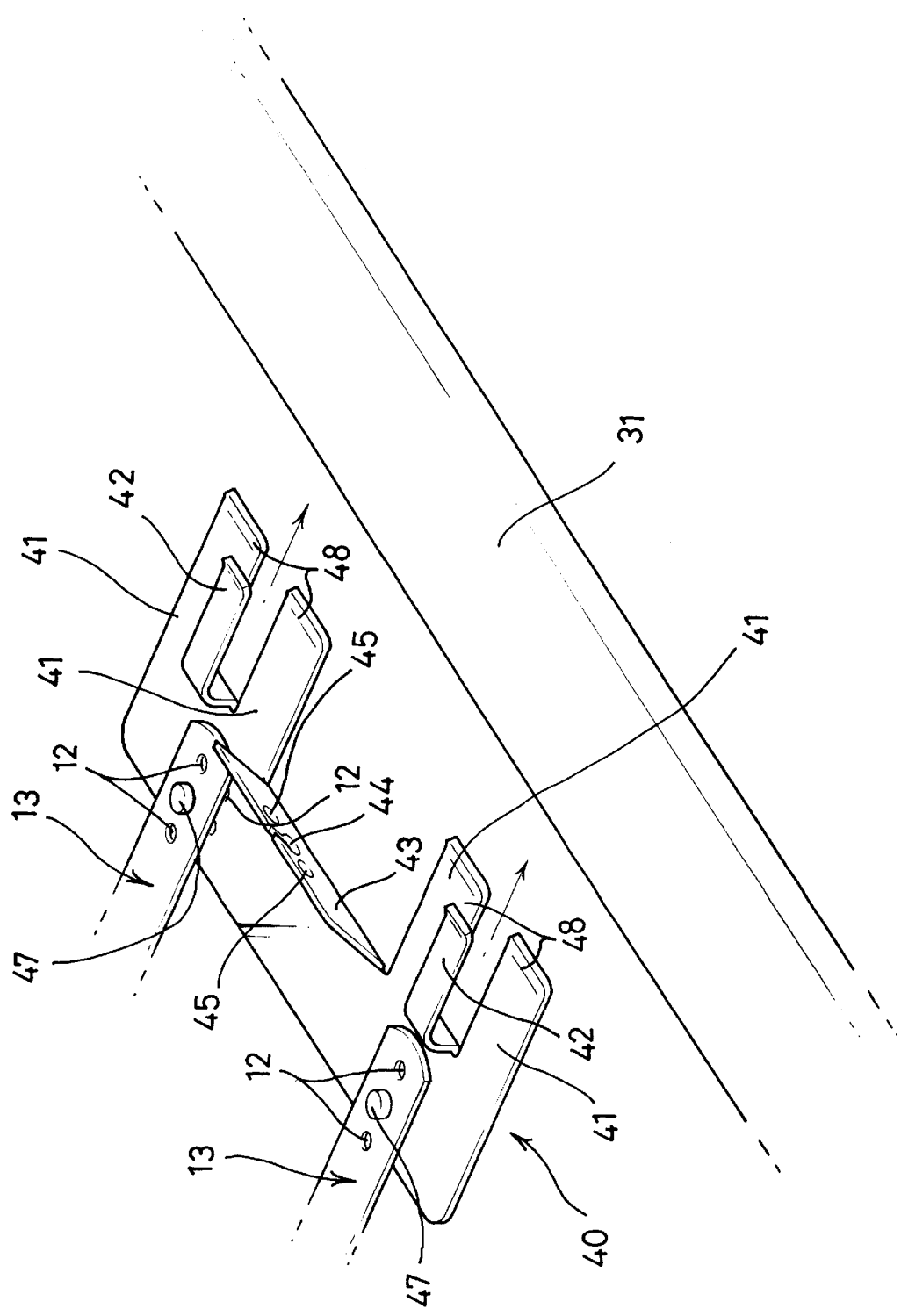

LUMBAR SUPPORT LOCKING APPARATUS FOR A CAR SEAT

BACKGROUND

1. Technical Field of the Invention

The present invention relates to an apparatus for fixing a lumbar support in relation to a car seat, and more particularly, to a lumbar support locking apparatus for a car seat in which a lumbar support is easily fixed to the seat frame for supporting the lumbar region of a driver, thereby simplifying the construction of the apparatus to improve the productivity and achieving comfort driving with less fatigue.

2. Background of the Invention

In general, a driver's seat and its assistant seat are separated by means of a console box, which is interposed therebetween. These seats are designed considering comfort to properly support the users by absorbing vibration from the road and thereby reducing fatigue. Because the weight and cost of a seat rate high in relation to the whole car, a lightweight and economical design is required.

In addition, stationary ride comfort which makes it possible for a driver to take a stable pose when seated in the car, driving comfort considering the vibration characteristics of the seat while driving, that is, dynamic ride comfort, and holding capability makes it possible for the driver to keep his stable pose when he turns or drives winding roads.

In general, the construction of the driver's seat and the assistant seat is typically divided into a seat cushion, seat back, and headrest. As for the seat cushion and the seat back, it has been widely spread that a seat spring is mounted in a seat frame and a trim cover assembly is covered on the seat frame. A lumbar support may be fixed inside the seat frame of the seats. The lumbar support serves to reduce fatigue of the driver during extended travel by variably supporting the lumbar region of the driver.

Conventionally, prior art lumbar supports have been formed of a rigid material, which lacks elasticity in the shape of an arc and are generally fixed in the seat frame at a position to support the driver's lumbar region. The lumbar support may have a two-position controllable lever, which is exposed at one side, so that the driver may adjust its height in the seat frame with the lever. In order to fix the position of conventional lumbar supports, a user may purchase an additional bracket which is fixed by means of a locking member or a clip member for fixation by inserting.

However, there are disadvantages in conventional lumber supports in that it is usually necessary to form an additional fixing bracket and a fixing member such as a bolt utilized to fix the lumbar support to a car seat, thereby increasing required manpower and decreasing the overall productivity of the support.

If a clip member is utilized to fix the lumbar support to the car seat, the required manpower may be reduced. However, an additional bracket should also be formed for mounting the clip member to the car seat frames. Further, there are still problems in that the lumbar support is likely to be departed from the seat frames or the clip member may be damaged since the lumbar support is fixed by being simply inserted into the circle clip member.

BRIEF SUMMARY OF THE INVENTION

The present invention is derived in order to resolve the problems of the prior art and has an object to provide a lumbar support locking apparatus for a car seat, in which a lumbar support is easily fixed to a car seat frame for comfortably supporting the lumbar region of a driver thereby facilitating comfort and non-fatigue driving. The apparatus of the present invention also improves workability in fixing a lumbar support to a car seat frame by simplifying the construction of the apparatus thus achieving a fixing operation of the lumbar support to a car seat by means of a very simple operation.

Another object of the present invention is to provide a lumbar support locking apparatus for a car seat, in which the lumbar support is easily fixed to the car seat frames. In particular, it is possible to keep the lumbar support stable in relation to the car seat frames by protecting the lumbar support without departing from the car seat frames due to a shift in the driver's weight.

The present invention has a further object to provide a lumbar supporting locking member for a car seat, which improves the market value and convenience of the lumbar support.

In order to achieve the above objects of the present invention, a lumbar support comprising a supporting member having a plurality of support wing parts that is formed with an elastic plate spring interposed between upper and lower seat frames of a car seat for supporting the lumbar region of a driver. The plurality of support wings are folded at both side end parts for surrounding the driver's lumbar region. A supporting plate is provided which protrudes in the center part by selective curving and has locking grooves at both upper and lower end parts of its main body, In addition, a support height control member is provided at one side part of the support plate for controlling the height of the protruded center part of the support plate by selective curving. A lumbar support locking apparatus is also provided which includes fixing members for fixing the respective upper and lower locking grooves of the main body of the support plate and the locking grooves of the locking member. Front fixing pieces are formed in a pair at both side parts of its main body to be inserted into the seat frames. Rear fixing pieces are formed between each pair of the front fixing pieces by folding downward and a connecting plate which is folded inward in a predetermined angle in the center part of the main body is also provided having a connecting groove at a lower part.

The foregoing and other advantages and features of the present invention will become more fully apparent by examination of the following description of the presently preferred embodiments and appended claims, taken in conjunction with the accompanying drawings.

BRIEF DESCRIPTION OF THE DRAWINGS

To better understand the invention, a more particular description of the invention will be rendered by reference to the appended drawings. These drawings only provide information concerning typical embodiments of the invention and are not to be considered limiting of its scope. The invention will be described and explained with additional specificity and detail through the use of the accompanying drawings, in which:

FIG. 3 is an expanded view of a principal part of a lumbar support locking apparatus for explaining the assembling operation of the lumbar support locking apparatus for fixing the lumbar support to a seat frame on a car seat.

DETAILED DESCRIPTION OF THE PREFERRED EMBODIMENTS

Now, preferred embodiments of the present invention will be described in more detail with reference to the accompanying drawings wherein like parts are referred to by like numerals throughout.

Figure 1:
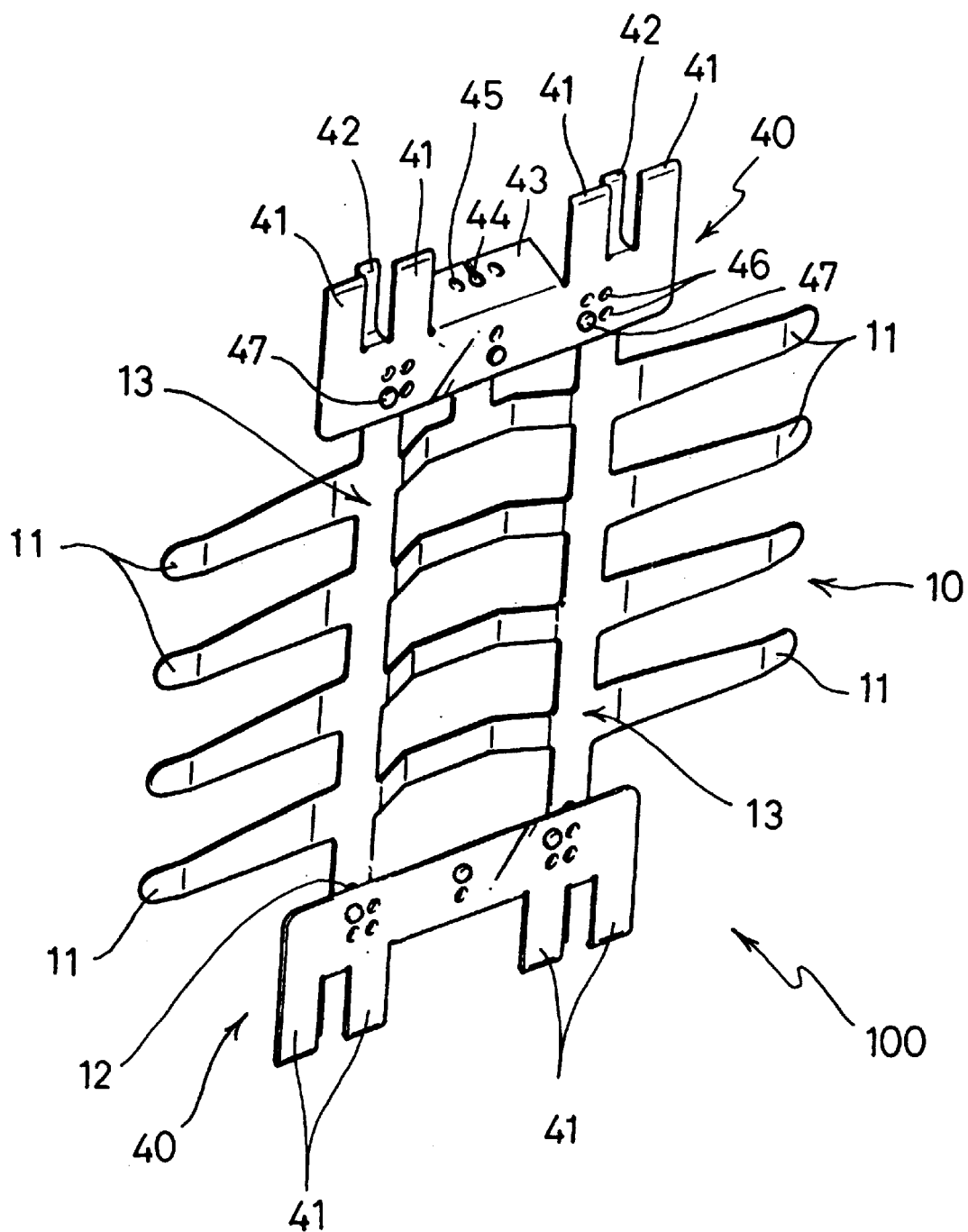
FIG. 1 is a schematic perspective view of lumbar support according to the present invention.

FIG. 1 is a schematic perspective view of the lumbar support according to the present invention.

With particular reference to FIG. 1, a lumbar support comprises a supporting member 10 having a plurality of support wing parts 11 which is formed with an elastic plate spring interposed between upper and lower seat frames 31 of a car seat for supporting the lumbar region of a driver. The plurality of support wings 11 are folded at both side end parts for surrounding the driver's waist. A supporting plate 13 protrudes in the center part by selective curving and has locking grooves 12 at both upper and lower end parts of its main body. Additionally, a support height control member 20 is formed at one side part of the support plate 13 for controlling the height of the protruded center part of the support plate 13 by selective curving. A lumbar support locking apparatus 40 is characterized in that fixing members 47 fix the respective upper and lower locking grooves 12 of the main body of the support plate 13 and the locking grooves of the locking apparatus 40. Front fixing pieces 41 are formed in pair at both side parts of its main body to be inserted into the seat frames. Rear fixing pieces 42 are foldably formed between each pair of the front fixing pieces 41 and a connecting plate 43 is folded inward in a predetermined angle in the center part of the main body and has a connecting groove 44 at a lower part.

Therefore, since the supporting member 10, which is curvedly protruded by the manipulation of the supporting height control member 20, may be fixed into the seat frames 31 by means of the lumbar support locking apparatus 40 by simply inserting it between the seat frames 31 at the upper and lower parts thereof, the required manpower may be reduced in the fixing operation of the lumbar support to the car seat frame 30 and thereby improving the productivity. Further, it becomes possible to install the lumbar support 100 in relation to the car seat frame 31 without any additionally bracket, thereby reducing the manufacturing cost.

Because of the front and rear fixing pieces 41 and 42 of the lumbar support locking apparatus 40, the lumbar support 100 may be firmly fixed between the car seat frames 31 so that the lumbar support 100 may be prevented from departing from the seat frames 31 even in case of external impact or long time use, thereby improving the commercial value and convenience of use of the present invention.

The lumbar support locking apparatus for fixing a lumbar support to a car seat frame according to the present invention will now be described in more detail.

Figure 2:
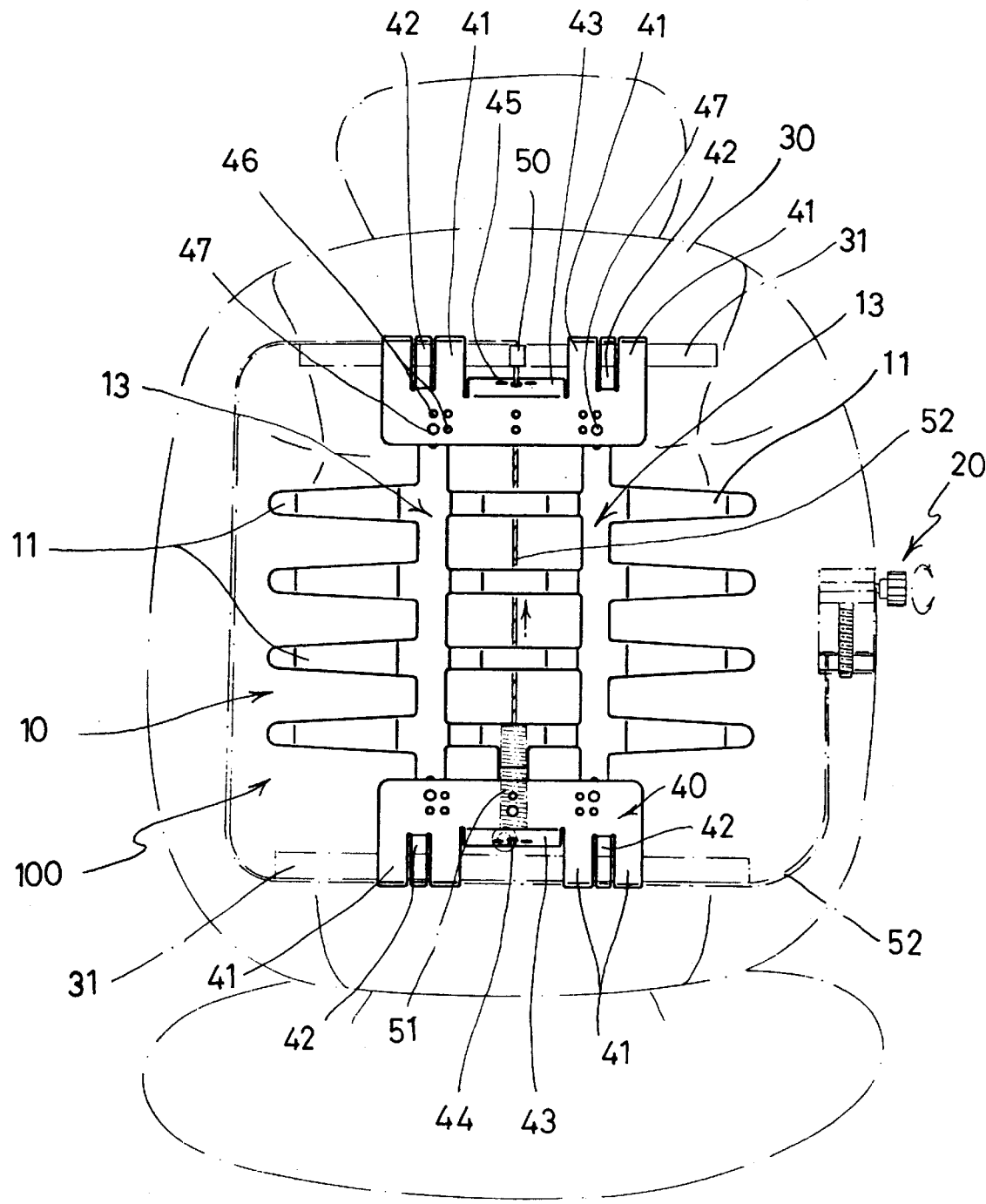
FIG. 2 is a schematic view showing the lumbar support according to the present invention, which is fixed on a car seat.

FIG. 1 is a schematic perspective view of lumbar support according to the present invention. FIG. 2 is a schematic view showing the lumbar support according to the present invention, which is fixed on a car seat. FIG. 3 is an expanded view of a principal part of the lumbar support locking apparatus for illustrating the fixing operation of the lumbar support to the seat frames on a car seat.

As shown in FIGS. 1–3, the lumbar supporting locking apparatus 40 is conveniently coupled with the respective upper and lower parts of the supporting member 10. The locking apparatus 40 is preferably made of the plate spring having superior elasticity and serves to fix the supporting member 10 between upper and lower the car seat frames 31 so as to support the lumbar region of a driver when seated in the car seat.

In one presently preferred embodiment, the locking member 40 has a plurality of locking grooves 46 at one side part at complementary positions corresponding to the locking grooves 12 which are formed in the upper and lower parts of the supporting plate 13 so that the locking grooves 46 of the locking member 40 are coupled with the locking grooves 12 by means of locking members 47. Since the size of a car seat varies depending on the kind of car, the locking grooves 46 of the locking member 40 are formed in a plurality of configurations so that it is preferable to utilize the lumbar support 100 variably by differently utilizing the plurality of locking grooves 46.

In addition, the locking member 40 is formed with front and rear fixing pieces 41 and 42 at both side body parts to be substantially inserted into the seat frames 31 to fix the lumbar support 100, wherein the front fixing pieces 41 are straightly formed in pairs at each side body part and the rear fixing pieces 42 are formed by folding downward between the pair of front fixing pieces 41 at each side body part, as best shown in FIG. 3. In one presently preferred embodiment, the rear fixing pieces 42 that are formed between the pair of front fixing pieces 41 are cut with a predetermined width in the center parts of the side body parts and folded in the shape of "L". Therefore, if the rear fixing pieces 42 are inserted in relation to the seat frames 31, the "L" shaped rear fixing pieces 42 engageably surround the rear part of the seat frame 31 so that the rear fixing pieces 42 may be positioned between the seat frames 31 for more stability.

Formed at both sides of the rear fixing pieces 42 are the front fixing pieces 41, whereas the rear fixing pieces 42 serve to support front seat frame 31. The respectively rear fixing pieces 42 are correspondingly located between the pairs of front fixing pieces 41 at both side body parts, so that the front and rear fixing pieces 41 and 42 serve to fix the lumbar support 100 at both side parts not to depart from the seat frames 31 due to the external impact or shifting of the weight of a driver. That is, the front fixing pieces 41 are provided in pair at both side body parts of the lumbar support locking apparatus 40 for reinforcing the front part of the seat frames 31 to prevent the lumbar support 100 from departing from its engagement with the seat frames 31 in case of an overloading force from the weight of the driver or external impact is applied to the supporting member 10.

Accordingly, the lumbar support locking member 40 may be easily assembled to engage the seat frame 31 via the side body parts which are formed with the front and rear fixing pieces 41 and 42. In this manner, the lumbar support locking member 40 provides superior impact-absorbing capability and prevents departure capability for supporting the lumbar support 100 from the front and rear part of the seat frames 31.

The connecting plate 43 is formed in the center part of the lumbar support locking member 40, being folded inward with a predetermined tilt angle, and has the connecting groove 44 at a lower part thereof The connecting plate 43 serves as an assistant for curvedly protruding the supporting member 10 by the manipulation of the supporting height control member 20. Therefore, the connecting groove 44 in the lower part of the connecting plate 43 functions to fix a wire member 52 which moves according to the manipulation of the supporting height control member 20.

That is, as shown in FIG. 1, one of the connecting plates 43 is mounted with a flange 50 at an end part thereof for controlling the wire member 52 by moving the wire member 52 inward through the connecting groove 44 of the connecting plate 43 and the other one of the connecting plates 43 is coupled with a spring member 51 to modify impact applied to the curved supporting member 10 and to keep a predetermined curved state of the supporting member 10 stable. Further, a plurality of assistant grooves 45 are selectively formed beside the connecting groove 44 in the connecting plate 43 for the sake of convenience of mounting the spring member 51 and the flange 50.

On the other hand, the folded end parts of the rear fixing pieces 42 function to guide the lumbar support locking apparatus 40 into the seat frames 31 while inserting the lumbar support locking apparatus 40 between the seat frames 31. In the same manner, rear surfaces of the end parts of the front fixing pieces 41 function are formed with a suspending part 48 to be locked at the end parts of the seat frames 31 more firmly so as to prevent the front fixing pieces 41 from departing from the seat frames 31, as best shown in FIG. 3. Therefore, in locking the lumbar support 100 to a car seat frame 31 according to the present invention, the front and rear fixing pieces 41 and 42 are provided at both side body parts of the lumbar support locking apparatus 40 to promote convenient coupling operation of the lumbar support 100 with the seat frames 31, so that the required manpower may be reduced, the productivity may be improved, and manufacturing cost may be reduced.

According to the present invention, the lumbar support member 10 which is curvedly protruded by manipulation of the supporting height control member 20 is conveniently coupled with the lumbar support locking apparatus 40 at its upper and lower parts and simply fixed between the upper and lower car seat frames 31 through the guide of the coupled lumbar support locking apparatus 40, so that the productivity may be increased by reducing the man power in the assembling operation of the lumbar support 100 into the car seat 30.

It is not necessary to provide any additional bracket, which was conventionally installed in relation to the seat frames 31 in order to install the lumbar support 100 in the car seat 30, thereby reducing manufacturing cost. Furthermore, since the front and rear fixing pieces 41 and 42 are formed in the lumbar support locking apparatus 40 to be fixed in the seat frames 31, the conventional problems that the lumbar support 100 departs from the seat frames 31 due to the external impact or long time use may be removed, and thereby improving the commercial value and the driver's convenience.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed and desired to be secured by United States Letters Patent is:

1. A lumbar support interposed between upper and lower seat frames of a car seat for supporting the lumbar region of a driver, said lumbar support comprising:

a support member having a main body, a plurality of support wings configured with opposing side ends, wherein each of said side opposing ends includes a bend for surrounding said lumbar region of said driver, an elastic plate spring interposed between said upper and lower seat frames of said car seat, a center portion of said plate adapted to protrude outward in a convexly curved configuration, and a plurality of selectively engageable locking holes formed at both upper and lower side end parts of said main body;

a height control means provided at one side of said support member for controlling the height of said protruding center portion of said plate spring relative to the disposition of the support member; and a lumber support locking apparatus comprising a plurality of selectively engageable locking holes adapted to fixedly engage said respective upper and lower locking holes of said support member, a pair of front fixing pieces configured for engaging said seat frames, a rear fixing piece formed between said pair of front fixing pieces, and a connecting plate folded inward at a predetermined angle in a center portion thereof and having a connecting groove formed therein.

* * * * *